3,488,322
IONIC OXYMETHYLENE COPOLYMERS
Kurt F. Wissbrun, Short Hills, and Frank M. Berardinelli, South Orange, and Martin B. Price, Berkeley Heights, N.J., assignors to Celanese Corporation, a corporation of Delaware
No Drawing. Filed Feb. 27, 1967, Ser. No. 619,010
Int. Cl. C08g 1/22, 1/14
U.S. Cl. 260—67
19 Claims

ABSTRACT OF THE DISCLOSURE

Ionic oxymethylene (OM) copolymers are produced by reaction of a primary OM copolymer containing reactive halogenoalkyl pendant groups (e.g., —$CH_2Cl$, —$CH_2Br$) with a metal (M) salt which is at least a di-(M salt) of a thiol-substituted saturated aliphatic carboxylic acid, e.g., disodium thioglycolate, NaS—$CH_2$—COONa Primary copolymer reactant contains the said pendant groups in an average quantity ranging from 1–40 thereof per 100 —$OCH_2$— groups in the copolymer. Salts of an alkali metal or of an alkaline-earth metal (including Mg) are preferred. Amount of M salt is at least the theoretical stoichiometrical amount, which may be from 100%–1000% in excess, required to couple the salt through its —SM group(s) with the primary copolymer by displacement of the halogen (X) in its pendant groups and formation of MX as a by-product.

Reaction conditions: In a volatile solvent, preferably comprising $H_2O$, e.g., a mixture of $H_2O$ and a lower alkanol. Maximum reaction temperature: 120°–180° C., preferably ca. 160° C. The pH is controlled in order to promote the desired reaction and to suppress side reactions.

Films can be compression-molded from the ionic OM copolymer. Increasing the content of X-containing pendant groups in the primary copolymer reactant reduces the crystalline order in the ionic copolymer, thereby improving clarity and ductility but decreasing strength and stiffness. The presence of the ionic groups improves the paint adhesion of an OM copolymer. The ionic OM copolymers have different flame characteristics as compared with the primary copolymer from which they are made.

---

This invention relates broadly to ionic polymers and, more particularly, to ionic oxyalkylene including oxymethylene copolymers which may be binary, ternary, quaternary or higher multi-component polymers.

Ionic hydrocarbon polymers are known and various types thereof are described in, for example, Canadian Patents 674,595; 690,326; 713,631; and U.S. Patent 3,264,272. Oxyalkylene polymers (both homopolymers and copolymers), specifically oxymethylene polymers having recurring —$CH_2O$— units, also are known. They can be prepared by methods and using starting materials such as are described by Kern et al. in Angewandte Chemie, 73 (6), 177–186 (Mar. 21, 1961); Sittig, "Polyacetals: What You Should Know," Petroleum Refiner, 41, 11, 131–170 (November 1962); and in various other publications and patents including the following U.S. Patents: 2,989,506—Hudgin et al.; 3,027,352—Walling et al.; 3,072,609—Berardinelli et al.; and 3,284,411—Martin et al. The latter patent discloses oxymethylene polymers having various reactive groups as side-chain branches from the main polymer chain (or as terminal groups of the chain) and which may be an alkali-metal or an alkaline earth-metal salt of a carboxylic acid having from 1 to 10 carbon atoms.

It is a primary object of the present invention to provide ionic oxymethylene copolymers having a combination of properties materially different from the oxymethylene (including ionic oxymethylene) copolymers heretofore known, and which are characterized by, for example, their improved ductility and clarity (transparency) especially when cast or pressure-molded in self-supporting, thin sheet or film form, as compared with other oxymethylene copolymers, specifically non-ionic oxymethylene copolymers.

Another object of the invention is to widen the field of utility of oxymethylene copolymers, particularly in the packaging area, for utilization either alone or as a component of a laminate with other natural or synthetic film-forming material including the various other hydrocarbon and oxyhydrocarbon polymers.

Other objects of the invention will be apparent to those skilled in the art from the following more detailed description and from the appended claims.

The objects of the invention are attained by first preparing a copolymer of (a) formaldehyde, trioxane or other formaldehyde-engendering compound (preferably trioxane) and (b) at least one comonomer containing both an epoxy group and a halogen-substituted, specifically a chlorine- or bromine-substituted, alkyl group, e.g., 1-chloroepoxyalkanes such as epichlorohydrin (1-chloro-2,3-epoxypropane); 4-chloromethyl-1,3-dioxolane; 1-bromoepoxyalkanes such as epibromohydrin; 4-bromomethyl-1,3-dioxolane; and homologues of such halogenated compounds. The resulting copolymer, which may be a binary, ternary or higher multicomponent copolymer, contains reactive halogenoalkyl pendant groups. This main or primary copolymer is then converted to ionic form by reaction with (c) a metal salt, which is at least a di-(metal salt), of a thiol-substituted mono- or polycarboxylic acid and, more particularly, a thiol-substituted saturated aliphatic mono-, di- or higher polycarboxylic acid, e.g., disodium thioglycolate, NaS—$CH_2$—COONa This coupling reaction is a nucleophilic substitution reaction of the thioglycolate dianion for the halogen (e.g., chlorine) atom of the copolymeric oxymethylene. For the purpose of brevity the terms "metal salt" and "di-(metal salt)" will usually be referred to hereafter merely as salt and di-salt.

Examples of a broader class of comonomers containing both an epoxy group and a halogen-substituted alkyl group that may constitute the comonomer of (b), supra, are those (including epichlorohydrin) embraced by the general formula $$CH_2\!-\!\!-\!\!CH_2(CH_2)_n\!-\!CH_2X$$
$$\diagdown\!\!O\!\!\diagup$$

wherein X represents a halogen, especially chlorine and bromine, and n represents a numeral from 0 to 4, inclusive. When n represents 0 the methylene group within the parentheses is not present and the compound is, of course, epihalogenohydrin, specifically epichlorohydrin or epibromohydrin when X represents Cl or Br, respectively.

Illustrative examples of other halogen-containing compounds that can be employed in addition to those hereinbefore mentioned (including those embraced by Formula I) are isomers of the previously-mentioned 4-chloro- and 4-bromomethyl-1,3-dioxolane, e.g., 4-chloro- and 4-bromomethyl-2,6-dioxolane and 6-chloro- and 6-bromomethyl-3,5-dioxolane.

The principles of the coupling reaction involved in practicing this invention may be illustrated in its simplest form by the following equation showing the reaction between epichlorohydrin (a preferred comonomer used in forming the copolymer) and disodium thioglycolate:

IA

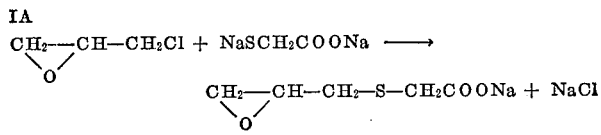

Surprisingly and unobviously the technique of this invention avoids the disadvantages of other types of reactions involving the coupling of a thiol compound with a polymer or copolymer containing ethylenic unsaturation in the copolymer molecule, e.g., the reaction of thioglycolic acid with such a reactive copolymer. The latter type of reaction is a free-radical reaction and, if attempted as a means of adding thioglycolic acid to an oxymethylene copolymer containing ethylenic unsaturation for the purpose of introducing ionic groups, tends or may tend to lead to degradation of the polymeric oxymethylene.

PREPARATION OF PRIMARY COPOLYMER

As shown in the cited art, a polymerization catalyst is employed in producing homopolymeric and copolymeric oxymethylenes. The preferred catalysts used in the preparation of the primary copolymer component of the ionic polymers of this invention are boron fluoride-containing catalysts, more particularly boron fluoride coordinate complexes with organic compounds in which oxygen or sulfur is the donor atom and boron fluoride gas itself. The coordinate complexes of boron fluoride may be a complex with, for example, an alcohol, a phenol, an acid, an ether, an acid anhydride, an ester, a ketone, an aldehyde, a dialkyl sulfide or a mercaptan. More specific examples of compounds useful in making such boron fluoride complexes are given in column 1, lines 42–50, of U.S. Patent No. 3,072,609 of Berardinelli and Stevenson dated Jan. 8, 1963, and assigned to the same assignee as the present invention. Coordinate complexes of boron fluoride with water, e.g., boron fluoride monohydrate, dihydrate or trihydrate also may be employed. Boron fluoride etherate, i.e., the coordinate complex of boron fluoride with diethyl ether, is the preferred coordinate complex. Boron fluoride dibutyl etherate is also particularly useful.

Taking a coordinate complex of boron fluoride as illustrative of the polymerization catalyst that is employed, it may be stated that the boron fluoride coordinate complex is generally present in the polymerization zone in an amount such that its boron fluoride content is between about 0.001 and about 1.0 (preferably from about 0.003 to about 0.1) weight percent based on the weight of the formaldehyde-engendering compound, specifically trioxane, and chlorine-contaniing comonomer in the polymerization zone.

Taking trioxane, which is preferred, as illustrative of the formaldehyde-engendering reactant, the other reaction conditions and product work-up procedure may be described as being generally as follows:

The trioxane and comonomer introduced to the reaction zone are preferably anhydrous or substantially anhydrous. Small amounts of moisture, such as may be present in commercial-grade feed materials or may be introduced by contact with atmospheric air, will not prevent polymerization but for best yields should be removed.

In one method of effecting polymerization the trioxane is polymerized in its molten state with the comonomer(s) and catalyst dissolved therein. The preferred temperature for such polymerization is between about 0° C. and about 100° C. The period of reaction for such polymerization may vary from about 2 minutes to about 72 hours. Pressures from subatmospheric to about 100 atmospheres or more may be used but atmospheric pressure is preferred.

In an alternative method of effecting copolymerization of the copolymerizable components the trioxane and comonomer(s), together with the polymerization catalyst, are dissolved in a common anhydrous solvent, e.g., cyclohexane, and permitted to react. The temperature for solution polymerization of this type may vary, for example, from about 10° C. to about 85° C., and the time of reaction from, for instance, about ½ hour to about 72 hours. In order to obtain polymers of exceptionally high molecular weight, it is desirable to initiate the polymerization in solution and then to reduce the temperature of the reaction mass so that most of the trioxane precipitates. Polymerization is then completed in the solid phase.

Since the halogen-containing comonomer combines vigorously with itself, it is usually advantageous to add at least a portion of the comonomer after the start of polymerization in order to avoid depletion thereof before the polymerization has been completed.

As pointed out in the aforementioned Berardinelli et al. patent, it is believed that epichlorohydrin under the polymerization conditions opens its ring between a carbon atom and the oxygen atom to produce a 2-chloromethyloxyethylene group,

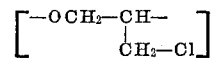

and that 4 - chloromethyl - 1,3 - dioxolane (or equivalent chlorine-containing monomer) opens its ring between a carbon atom and an oxygen atom to produce a linear structure comprising an oxymethylene group linked to a 2-chloromethyloxyethylene group.

In producing the copolymer reactant the mol ratio of the halogen-containing comonomer to the formaldehyde-engendering compound, specifically trioxane, may vary from about 0.03 mol to about 1 mol of the aforesaid comonomer per mol of the trioxane, but is preferably within the range of from about 0.05 mol to about 0.4 mol of comonomer per mol of trioxane. When the starting reactants are epichlorohydrin and trioxane and the weight percentages of the former are up to about 20–25 weight percent of the total epichlorohydrin and trioxane, then the weight percentages in the charge and the molar percentages in the resulting copolymer are approximately the same. At higher weight percentages (e.g., from about 30–50 weight percents) or epichlorohydrin in the charge, the mol percent of epichlorohydrin in the copolymer usually is from about 10% to about 35% less (based on the respective percentages) than the corresponding weight percentages in the reaction mix.

In addition to the oxymethylene and halogenoalkyloxyethylene, e.g., chloro- or bromomethyl-(or ethyl- or -propyl-)oxyethylene groups, the copolymer reactant, and therefore also the ionic copolymer produced therefrom, optionally may include other recurring structural groups and especially oxyalkylene groups having at least two carbon atoms. Oxyethylene groups are particularly desirable and can be incorporated into the polymer structure by including, in the mixture with the other two comonomers, the desired amount of a cyclic ether having two adjacent carbon atoms, e.g., ethylene oxide, dioxolane, or chain-branching agents such as pentaerythritol diformal, vinylcyclohexane diepoxide, butanediol diglycidyl ether, and the like. Other examples are given in, for instance, the aforementioned U.S. Patent No. 3,027,352 and in a Heinz et al. copending application identified later herein.

A suitable range of proportions of a modifying cyclic ether for incorporation into the mixture of comonomers is between about 1 and 100 weight percent, based on the weight of the trioxane, with higher proportions being associated with the above-identified delayed-addition technique for effecting copolymerization. In such primary copolymer reactants containing reactive oxymethylene groups, reactive oxyethylene groups and reactive 2-chloromethyloxyethylene (or other halogenoalkyloxyethylene) groups, the oxyethylene groups may suitably comprise between about 0.1 and 40 weight percent (based on comonomer charge) of the copolymer. The combined weight of oxyethylene and 2-chloromethyloxyethylene (or other halogenoalkyloxyethylene) groups generally will not exceed 50% of the weight (based on comonomer charge) of the copolymer.

Upon completion of the polymerization reaction and wherein normally a relatively large amount of catalyst has been used, it is desirable to neutralize the activity of the catalyst since prolonged contact with the catalyst degrades the copolymer. This neutralization may be effected by, for example, treating the copolymer with an aliphatic amine, e.g., tri-n-butylamine, in a stoichiometrical excess over the amount of free catalyst in the copolymer and, preferably, in an organic wash liquid that is a solvent for unreacted trioxane. Or, if desired, the catalyst activity can be neutralized by washing the copolymer with water. A detailed description of methods of neutralizing catalyst activity will be found in U.S. Patent No. 2,989,509 of Hudgin and Berardinelli dated June 20, 1961.

CONVERSION OF THE PRIMARY COPOLYMER TO IONIC FORM

The primary copolymer is converted to ionic form by a coupling reaction with a salt, which is at least a di-salt and can be a tri-, tetra- or higher poly-salt, of a thiol-substituted mono- or polycarboxylic acid, e.g., a di-salt of thioglycolic acid or of higher members of the homologous series and wherein the cation is an alkali metal or an alkaline-earth metal including magnesium. Thus the cation may be sodium, potassium, lithium, cesium, rubidium, calcium, strontium, barium or magnesium. The use of a cation of other monovalent and polyvalent metals and metalloids is not precluded.

Thioglycolic acid (TGA) is the lowest member of a class of thiol-substituted saturated aliphatic monocarboxylic acids, the salts of which are useful as a coupling agent in converting the non-ionic oxymethylene copolymer to ionic form, and which may be represented by the general formula (IB)          HS—(CH$_2$)$_n$—COOH wherein $n$ represents a positive integer, more particularly from 1 to 6, inclusive, and preferably from 1 to 4, inclusive.

Examples of other thiol-substituted saturated aliphatic carboxylic acids (both mono- and polycarboxylic acids) of which the poly-salts can be made and used in practicing this invention are those having the formulas

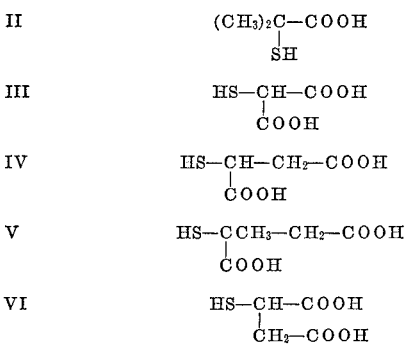

Other examples of thiol-substituted mono- and polycarboxylic acids that can be converted to poly-salts and these salts then used as coupling agents in practicing the present invention will be apparent to those skilled in the art from the foregoing illustrative examples.

The chosen salt of the thiol-substituted carboxylic acid, if not commercially available, is prepared in known manner merely by contacting the reactants in solution state, with or without heating as may be required by the solubility characteristics of the particular metal salt and the particular thiol-substituted carboxylic acid. The reactants may be dissolved in water or in a mixture of water and an organic solvent, e.g., an alcohol including a lower alkanol such as methanol, ethanol, and the like. In the preferred procedure the solution of the metal salt of the thiol-substituted carboxylic acid is either prepared in or added to the reaction vessel in which the coupling reaction between the salt and the halogen-containing oxymethylene copolymer is carried out.

The amount of the metal salt of the thiol-substituted carboxylic acid should be at least the theoretical stoichiometrical amount required to couple the said salt through its —SM (where M=metal) group or groups with the halogen-containing oxymethylene copolymer. This coupling reaction proceeds through the displacement of the halogen by the —SM group with the formation of the metal salt of the halogen as a by-product of the reaction. From this it will be seen that the amount of the metal salt is such that the total —SM groups are present in the said salt in at least the stoichiometrical amount, based on the halogen content of the said copolymer, required to effect the aforesaid coupling reaction, and advantageously from about 100% to about 1000% (preferably about 100%) in excess thereof. The pH of the solution containing the aforesaid metal salt and the halogen-containing oxymethylene copolymer is at least about 9, more particularly a pH of from 9 to about 13, and preferably from about 10 to 12.

Taking disodium thioglycolate as typical of the coupling agent that is employed, a typical and preferred procedure for its preparation is as follows:

(1) Charge a reaction vessel, e.g., an autoclave in which the coupling reaction is to be effected, with a predetermined amount of a lower alkanol, specifically methanol.

(2) Add the required amount of thioglycolic acid (TGA), and mix with the alcohol.

(3) Add the required amount of sodium hydroxide slowly with stirring. The sodium hydroxide, if desired, may be in the form of a concentrated (e.g., a 50%) aqueous solution. For 100 g. of TGA, 88 g. of NaOH (or 175 g. of 50% NaOH solution) is required for neutralization.

(4) Add deionized water in such an amount as may be needed to bring the vessel to the desired volume for optimum operation, including mixing, in the subsequent coupling reaction. Mix the added deionized water with the solution already in the reaction vessel. Check the pH of the resulting solution to be sure that it is least 10. If not, add more solid NaOH (e.g., in flake form) or aqueous NaOH solution with stirring until the pH of the solution has been increased to at least 10.

The coupling reaction is effected by first charging the air-dried halogen-containing oxymethylene copolymer to the reaction vessel containing the solution of disodium thioglycolate (DSTG).

In calculating the charges of the aforesaid copolymer reactant and of the DSTG, it may be pointed out that for exact equivalence each gram of epichlorohydrin (CEP) in the copolymer charged requires one gram of DSTG, calculated as TGA. Normally an excess and, more particularly 100% excess, is used (i.e., 2 g. of DSTG, calculated as TGA, per. g. of CEP). If a chlorine analysis has been obtained, the CEP content is obtained by multiplying the weight percent of chlorine by 2.6.

While agitating the reaction mixture in the autoclave, it is heated as rapidly as possible to about 160° C. Depending upon the size of the reaction vessel and the heating means, this heating-up period may vary, for instance, from about 10 minutes to about 2 hours or more. The temperature is usually held at about 160° C. (about 200–240 p.s.i.g.) for about 1 hour. Higher or lower maximum temperatures of reaction and for shorter or longer periods of time may be employed as desired or as may be required depending upon such influencing factors as, for instance, the particular starting reactants employed, the particular size and type of reaction vessel used, the ease or difficulty with which halogen, specifically chlorine, is split off from the halogen-containing copolymer, and the like. Thus, the maximum temperature of reaction may be within the range of from about 120° C. to about 180° C., and the time at the maximum temperature may vary from about ¼ to about 6 hours, more particularly from about ½ to about 4 hours.

Prior to discharging the polymer solution from the autoclave in which the coupling reaction was effected, a so-called "quench" vessel is half-filled with deionized water, and to this water is added sufficient NaOH to bring the pH up to at least 10. Advantageously this vessel is a stainless steel vessel having a capicity at least three times that of the autoclave. Preferably this vessel, if more than about 10 gallons in size, is provided with a bottom or a dip-leg tube discharge.

The hot solution of ionic copolymer is discharged into the alkaline aqueous solution in the quench vessel, thereby causing the copolymer to be precipitated as a highly swollen gel. By means of suitable valves and adjustment thereof, a smooth, steady discharge of copolymer solution from the reaction vessel is obtained. Nitrogen pressure is used to eliminate any plugging of the discharge line with copolymer solids thus avoiding any necessity to vent the vessel to low pressure. By regulating the nitrogen pressure, any back flow of solution into the reaction vessel can be avoided.

The precipitated ionic copolymer is filtered off by suitable means such as by passage through a filter press, by collection on a Buechner funnel if the batch is relatively small in size, or by centrifuging. The isolated copolymer is washed to remove soluble impurities such as salts by slurring three times with water, methanol, isopropanol or other alcohol, or a mixture of any or all of these in any proportions, followed each time by filtration or centrifuging to isolate the washed copolymer, and finally is slurried with acetone followed by isolation as has just been described. The acetone wash is used in order to facilitate drying. The washed and isolated ionic copolymer is then dried by any suitable means, e.g., by air-drying at ambient temperature for about 12 to 20 hours, more particularly about 16 hours.

From the foregoing description of the invention, and especially from the illustrative examples including the tabulated data that follow, it will be seen that the present invention provides a composition of matter comprising a particular and unobvious class and species of ionic oxymethylene copolymer(s) as well as a method for the preparation of the same.

These new copolymers probably best can be described by stating that they are obtained by reaction of (A) a primary oxymethylene copolymer containing reactive halogenoalkyl (including, for example, chloro- and bromoalkyl) pendant groups in an average quantity corresponding to from about 1 to about 40 (more particularly from about 2 or 3 to about 20 or 30, and preferably from about 5 to about 20) of the said groups per 100 —OCH$_2$— groups in the said copolymer with (B) a metal salt. This metal salt is at least a di-(metal salt) of a thiol-substituted saturated aliphatic carboxylic acid, which latter may be a monocarboxylic, dicarboxylic or higher polycarboxylic acid, but which is preferably a monocarboxylic acid and, still more preferably, one that does not contain more than about 7 carbon atoms.

The metal salt can be a salt of a monovalent metal or of a polyvalent metal such a divalent metal. The preferred salts are salts of an alkali metal or an alkaline-earth metal (including magnesium), and of these the alkali-metal salts, especially the sodium salt, are more preferred. The amount of the metal salt that is caused to react with the primary oxymethylene copolymer and how it functions in coupling with the copolymer has been described at some length hereinbefore.

The primary oxymethylene copolymer is preferably prepared from trioxane as the formaldehyde-engendering compound. An epihalohydrin of the kind embraced by Formula I is preferably employed as the source of the halogenoalkyl pendant groups in the copolymer, and of these epichlorohydrin is most preferred.

The coupling reaction is effected as hereinbefore both broadly and rather specifically described. The volatile solvent used as the liquid reaction medium preferably comprises water, more particularly a mixture of water and a lower alkanol, specifically methanol. As stated hereinbefore, the maximum temperature of reaction may be within the range of 120° C. to 180° C. Although the preferred maximum reaction temperature is about 160° C., it can be lower (e.g., about 140° or 150° C.) or higher (e.g., about 170° C.) than the preferred 160° C. maximum temperature.

It is important that the pH of the reaction mass be controlled during the coupling reaction in order to promote the desired reaction and to suppress or minimize side reactions. The following explanation may be helpful to those skilled in the art in understanding the reasons for this. As in Equation IA, the equations shown below are merely for the purpose of illustrating in simplest form the principles involved and not, actually, that of a halogen-containing copolymer structure in a coupling reaction with a di-(metal salt) of a thiol-substituted carboxylic acid, e.g., disodium thioglycolate.

The desired reaction may be illustrated by the following simplified equation:

(VII)  $RCl + SCH_2COO^- \rightarrow RSCH_2COO^- + Cl^-$  

If the pH is too low, no reaction takes place because the ionization of the —SH group is repressed. The neutralization of the thioglycolic acid effectively occurs in two steps because the ionization constant of the —SH group is much less than that of the —COOH group, as is illustrated in the following:

(VIII)  $HSCH_2COOH + OH^- \rightleftharpoons HSCCH_2COO^- + H_2O$  

(IX)  $HSCH_2COO^- + OH^- \rightleftharpoons SCH_2COO^-$  

The coupling reaction illustrated by the foregoing equations lowers the pH of the reaction mass due to the displacement of halogen from the copolymer to form the salt in aqueous solution. Hence the pH of the reaction mass should be sufficiently basic so that lowering of the pH by the evolved halogen is not such as to permit the copolymer component of the mass to be subjected to acid attack.

However, if the pH of the reaction mass is too high, difficulties are encountered for the reason that another reaction competes with the displacement of Cl by RS$^-$, namely, displacement of OH$^-$ (e.g., hydrolysis) as illustrated by the following equation:

(X)  $RCl + OH^- \rightarrow ROH + Cl^-$  

This reaction is undesirable in itself because it decreases the ionic content of the reaction mass.

Another reason for suppressing the reaction by not allowing the pH of the reaction mixture to be too high initially is because the alcohol, which thereby is formed, appears to be thermally unstable and causes or results in degradation of the copolymer, probably via formaldehyde evolution and autoxidation of the formaldehyde to formic acid. Evidence of the correctness of this explanation was obtained by reacting an epichlorohydrintrioxane copolymer with an aqueous solution of NaOH, whereby the copolymer was completely destroyed and an acidic solution was obtained.

For reasons such as those just mentioned, the pH of the reaction mixture or mass, and which contains the metal-salt coupling agent and the halogen-containing oxymethylene copolymer is, at the beginning of the reaction period, at least about 9 (more particularly from 9 to about 13, and preferably about 10 to 12) and is basic throughout the said period.

The ionic copolymers of this invention have a combination of unusual properties. As the content of the halogen-containing, specifically chlorine-containing, groups in the nonionic copolymer reactant is increased the crystalline order in the ionic copolymer is reduced, thereby improving clarity and ductility but resulting in a decrease in the strength and stiffness. This effect seems to be dependent upon the rate of cooling from the melt except at very high levels of comonomer in the oxymethylene copolymer. It is believed that the hypothesis properly may be advanced that the effect of the ionic forces is to retard crystallization, thereby reducing the crystallite size of a rapidly cooled polymer. Confirmation of the hypothesis concerning the relation of ionic forces, crystallization rate and crystalline order was obtained by varying the neutralizing cation.

Surprisingly and unobviously it was also found that, in the ionic oxymethylene copolymers of this invention, the melt viscosity thereof and its temperature dependence are increased by the introduction of ionic groups but the shear rate dependence is unaffected.

Paint adhesion is materially improved by the introduction of ionic groups into an oxymethylene copolymer. Paint adhesion was tested as follows: A compression-molded film, about 10 mils thick, of an ionic oxymethylene copolymer of this invention, and in the preparation of which trioxane, epichlorohydrin and disodium thioglycolate were used, was degreased by treatment with carbon tetrachloride, wiped dry and then sprayed with an aerosol automotive touch-up paint (Instant Tempo Spray No. 379, based on Duco Lacquer No. 4072). After drying for about 16 hours at room temperature, a ¼-inch crosshatch was made with a razor blade, an adhesive tape (Scotch-brand tape) was applied to the coating of dried paint, and then removed. Non-ionic oxymethylene copolymers both with and without epichlorohydrin as an integral part of the copolymer structure were made into compression-molded films and prepared for testing for paint adhesion in identically the same manner. The latter two types of non-ionic oxymethylene copolymers showed no paint adhesion whatsoever on the described test, the adhesive tape removing all of the paint in contact with it. In marked contrast, all of the ionic oxymethylene copolymers that were thus tested showed very good paint adhesion, some showing complete paint adhesion and others almost complete retention of the paint.

The foregoing results suggest that the ionic copolymers of this invention would be valuable additives in paint formulations either in a primer paint or in a top-coating paint to improve adhesion, especially those wherein the painted surfaces are not exposed to high humidity conditions, since, in general, the ionic copolymers with which this invention is concerned are water-sensitive.

Although films of the oxymethylene copolymers of this invention are flammable, they differ from non-ionic oxymethylene polymers in their burning characteristics in at least two respects. Their flame is luminous rather than almost invisible, and they form a non-dripping char which is fairly readily extinguished by contact with a cold surface. In marked contrast non-ionic oxymethylene polymers (both homopolymers and copolymers) tend to release pools of molten polymer which continue to burn. By itself, char formation is not enough to impart flame resistance to organic polymers such as those with which this invention is concerned, but it does suggest that this characteristic might provide a valuable subsidiary mechanism in combination with other flame-retarding agents as a means of imparting flame resistance to oxymethylene polymers.

In order that those skilled in the art may better understand how the present invention can be carried into effect, the following examples are given by way of illustration and not by way of limitation. All parts and percentages are by weight unless otherwise stated.

EXAMPLES 1–13

These examples illustrate the production of ionic oxymethylene polymers (both binary and ternary polymers) and which are prepared by coupling disodium thioglycolate (DSTG) with a non-ionic polymer of trioxane and epichlorohydrin with or without a third monomer, specifically pentaerythritol diformal (PEDF), vinylcyclohexane diepoxide (VCH) or butanediol diglycidyl ether (BDGE).

PREPARATION OF COPOLYMER PRECURSOR

Materials

Trioxane, distilled
Epichlorohydrin, reagent grade
Cyclohexane, dry
Cyclohexane, reagent grade
Boron trifluoride dibutyl etherate ($BF_3$)
Tributylamine (TBA)
Acetone Equipment Readco Sigma Blade Mixer
Large stainless steel bucket
Clean glassware (dried for about 16 hours at 110° C., then capped with drying tubes or aluminum foil)
   (a) 3-liter round-bottomed flask with Glas-col flask mantle
   (b) 125 ml. ground glass-stoppered Erlenmeyer flask
   (c) 2 ml. syringe
   (d) 1000, 500, 250 and 50 ml. graduated cylinders Procedure (1) CLEAN READCO MIXER (a) Clean mixer mechanically as well as possible.
(b) Rinse with 2 liters dry cyclohexane and drain.
(c) Heat mixer to 100° C. for one hour.
(d) Adjust temperature (jacket water) to 65° C.

(2) CHARGE REAGENTS (a) Fill a heated 3-liter flask to the mark with freshly distilled trioxane, and stopper.
(b) Weigh flask, accessories and contents.
(c) Pour rapidly into Readco mixer, and close quickly.
(d) Reweigh flask and accessories.
(e) Measure specified amount of epichlorohydrin into dry graduate, pour rapidly into Readco mixer, and close quickly.
(f) Start mixer to mix reagents.

(3) CATALYST ADDITION AND POLYMERIZATION (a) Put 50 ml. of reagent grade cyclohexane into ground glass-stoppered, 125-ml. flask.
(b) Draw specified amount of $BF_3$ catalyst into dry syringe, and add to cyclohexane.
(c) Shake catalyst-cyclohexane mixture, pour quickly into Reado mixer, and close.
(d) Onset and course of polymerization is sometimes difficult to determine. Evolution of formaldehyde may be one indication. Check the reaction every 15 minutes and note changes in appearance, e.g., turbidity, creaminess, etc., that may have occurred. Add additional catalyst at specified times when it is desired to thusly modify the catalyst-addition procedure.
(e) Stop the Readco mixer when the reaction is considered to be finished.

(4) QUENCHING AND WASHING (a) Dump the contents of the Readco mixer into a clean, large, stainless steel bucket about half filled with acetone containing 25 ml. TBA, slurry the mixture, and decant.

(b) Grind the wet polymer in Bantam grinder.

(c) Repeat step (a).

(d) Filter the ground polymer.

(e) Slurry the polymer again with acetone containing no TBA; filter, and then repeat once more.

(f) Air dry the product in a tray having a porous cloth or similar covering, e.g., cheesecloth. This product is an unhydrolyzed copolymer of trioxane and epichlorohydrin. Weigh the dried product to determine the yield.

Solution hydrolysis of the trioxane (TO)-epichlorohydrin (CEP) copolymer is carried out as described below in order to stabilize the copolymer by removal of hydrolyzable terminal end groups from the linear backbone without removal of an excessive or objectionable amount of chlorine from the pendant chloromethyl groups.

Materials

Unhydrolyzed polymer
Methanol
Deionized water
Triethylamine (TEA)
Acetone

Equipment

Stirred, heated autoclave fitted with: (a) pressure gauge reading to at least 1000 p.s.i.g.; (b) top vent valve; (c) top entry, valved, for external nitrogen pressuring; (d) bottom discharge tube, with two Jamesbury valves in series, with a valved T for nitrogen pressure between the Jamesbury valves; and discharge line to quench vessel.

Stainless steel quench vessel having a capacity at least three times that of the autoclave.

Large Buechner funnel or 12-inch SS centrifuge

Drying trays

Charges

With regard to the charges, the following general principles apply:

(1) The solvent is a mixture of methanol and water that contains 55% methanol by weight or 60% by volume.

(2) The amount of TEA used depends on the residence time. It should be at least 2 ml./100 g. polymer. When the autoclave employed has a capacity of 2 gallons, it may be necessary to use as much as 5 ml. TEA/100 g. polymer.

(3) The total charge to any autoclave should be between ⅓ of the vessel's capacity and ⅔ of its capacity.

Procedure (1) Charge the materials and seal the vessel; start the agitator.

(2) Open the top vent valve and the Jamsbury valve (No. 1) which is located closest to the bottom discharge. Blow nitrogen through the valved T at low pressure (about 30 p.s.i.g.) thereby to prevent polymer from settling in the discharge tube.

(3) Begin heating as rapidly as possible to a temperature of about 160° C. (This takes about 2 hours when a 2-gallon autoclave is used in some runs; and about 12 minutes when a 15-gallon autoclave is employed in other runs.) As the temperature rises to about 85° C. the top vent, the No. 1 Jamesbury valve and the nitrogen valve must be closed.

(4) To prevent errors caused by a thermocouple lag, the temperature is monitored by means of the pressure gauge. It has been found that a vapor pressure of 200 to 240 p.s.i.g. ensures that the copolymer has dissolved. Hydrolysis takes place very rapidly once the copolymer is in solution.

(5) The hot copolymer solution is discharged into a large volume of water, which is at least three times that of the aforesaid solution. The water causes the copolymer to precipitate as a highly swollen gel. The two Jamesbury valves are then regulated so as to obtain smooth, steady discharge of solution under its own pressure. The nitrogen pressure is regulated so as to prevent backflow.

(6) The copolymer is isolated by filtration through a Buechner funnel or by centrifuging.

(7) The isolated copolymer is slurried with acetone and then either re-filtered or re-centrifuged. This is repeated another time for a total of two acetone washes.

(8) The acetone-washed copolymer is spread on drying trays, covered with cheesecloth, and air-dried for about 16 hours at ambient temperature. The dried copolymer is weighed, and the loss on hydrolysis is determined.

COUPLING REACTION OF COPOLYMER PRECURSOR WITH DSTG

The procedure is basically the same as that described above with reference to the solution hydrolysis of the unhydrolyzed copolymer with the following exceptions:

(1) A solution of disodium thioglycolate having a pH of from 9 to 13, and preferably from 10 to 12, is used instead of triethylamine.

(2) The reaction time is one hour at 160° C. (200 p.s.i.g.).

(3) The quench water is made alkaline with sufficient NaOH to bring its pH up to at least 10.

(4) The ionized copolymer is washed three times with methanol, and finally (to assist drying) once with acetone.

The equipment employed is the same as that used in effecting solution hydrolysis of the unhydrolyzed, non-ionic copolymer.

The DTSG reactant used in Examples 1–13 was prepared in accordance with the typical procedure given earlier in this specification. The details of the procedure for effecting the coupling reaction with the copolymer precursor, and for quenching, washing and isolating the resulting ionic copolymer were essentially the same as given earlier herein immediately following the aforementioned description of the preparation of the DSTG reactant.

Additional and more specific details are given in Tables I and II that follow.

TABLE I.—TRIOXANE-EPICHLOROHYDRIN COPOLYMERIZATIONS

| Example No. | Charge, percent | | | Total catalyst, p.p.m. | Catalyst add., time | Total Polym., time | Raw yield, percent | Hydrolysis loss, percent | I.V.[d] | | Cl, percent | Mols CEP/100 mols $CH_2O$ |
|---|---|---|---|---|---|---|---|---|---|---|---|---|
| | TO | CEP | Other | | | | | | Raw | Hydrolysis | | |
| 1 | 90 | 10 | | 100 | 5 seconds | 12 minutes | 66 | 19 | | 0.82 | 3.6(3.4) | 3.2 |
| 2 | 86 | 14 | | 125 | 2 hours | 3.3 hours | 55 | 28 | 0.33 | 0.39 | 5.1(5.4) | 5.0 |
| 3 | 79 | 21 | | 400 | 1.75 hours | 2.9 hours | 68 | 12 | 0.26 | 0.38 | 6.6(6.4) | 6.7 |
| 4 | 95 | 5 | | 100 | 5 seconds | 1 hour | 88 | 15 | | 0.92 | 1.9(1.6) | 1.6 |
| 5 | 70 | 30 | | 900 | 1 hour | 3.2 hours | 52 | 14 | 0.28 | | 8.2(8.6) | 9.1 |
| 6 | 85 | 15 | | 150 | 2 hours | 3.5 hours | 80 | 15 | | 0.56 | 4.9 | 4.8 |
| 7 | 85 | 15 | 2(PEDF)[a] | 125 | do | 4.2 hours | 76 | 12 | | 0.57 | 5.3 | 5.25 |
| 8 | 85 | 15 | 0.5(VCH)[b] | 150 | 1 hour | 2.3 hours | 79 | 18 | | 0.68 | 4.8 | 4.7 |
| 9 | 85 | 15 | 0.3(BDGE)[c] | 125 | do | 2.5 hours | 62 | 25 | | 0.53 | 5.8 | 5.8 |
| 10 | 85 | 15 | | 200 | do | 2 hours | 77 | 11 | | 0.74 | 4.7 | 4.6 |
| 11 | 84 | 15 | 2(BDGE) | 200 | do | 2.5 hours | 71 | 17 | | Insoluble | 5.3 | 5.2 |
| 12 | 85 | 15 | 1(BDGE) | 150 | do | 2 hours | 81 | 15 | | 1.68 | 4.5 | 4.4 |
| 13 | 80 | 20 | | 200 | 1.5 hours | 3 hours | 67 | 14 | | 0.54 | 7.1 | 7.4 |

[a] Pentaerythritol diformal.
[b] Vinyl cyclohexane diepoxide.
[c] Butanediol diglycidyl ether.
[d] In $\eta rel./C.$ at $C.=0.1\%$ in 98/2 p-chlorophenol/α-pinene at 60° C.

TABLE II.—COUPLING REACTIONS OF DSTG* WITH COPOLYMERS OF TABLE I

| Example No. | Solvent, liters | Polymer, g. | DSTG*, g. | Mols glycolate/ mol Cl | Yield, g. | Analyses | | | | Mols comonomer/ 100 mols CH$_2$O based on | | |
|---|---|---|---|---|---|---|---|---|---|---|---|---|
| | | | | | | I.V.[1] | Percent C[2] | Sulfated Ash, percent | Percent S | Cl | Ash | S |
| 1 | 3.5 | 400 | 370 | 7.00 | 420 | 0.58 | 3.5 | 5.7 | 2.5 | 2.3 | 2.5 | 2.7 |
| 2 | 18 | 1,000 | 925 | 4.66 | 944 | 0.35 | 5.2 | 11.3 | 4.3 | 5.0 | 6.5 | 5.2 |
| 3 | 18 | 1,000 | 925 | 3.36 | 1,004 | 0.36 | 6.5 | ([3]) | 4.3 | 6.7 | | |
| 4 | 20 | 1,000 | 148 | 2.27 | 1,215 | 0.66 | 1.7 | 2.27 | 1.3 | 1.6 | 1.2 | 1.4 |
| 5 | 18 | 1,050 | 925 | 2.74 | 1,369 | 0.30 | 8.4 | 13.3 | 6.0 | 9.1 | 8.2 | 8.3 |
| | | | | | | | | | 6.2 | | | 8.7 |
| 6 | 18 | 1,009 | 925 | 4.89 | 428 | 0.45 | 4.9 | 9.8 | 3.7 | 4.8 | 5.4 | 4.4 |
| | | | | | | | | 7.9 | 3.6 | | 4.1 | 4.2 |
| 7 | 18 | 1,000 | 925 | 4.57 | 1,192 | 0.53 | 5.3 | ([3]) | 3.5 | 5.3 | | |
| 8 | 18 | 1,000 | 925 | 5.03 | 1,478 | 0.43 | 4.8 | 16.5 | 3.5 | 4.7 | 11.5 | 4.0 |
| 9 | 18 | 1,000 | 925 | 4.17 | [5]780 | 0.43 | 5.8 | 10.4 | 4.3 | 5.8 | 5.8 | 5.3 |
| 10-A | 20 | 1,000 | 415 | 2.31 | 816 | 0.54 | 4.7 | 8.2 | 3.5 | 4.6 | 4.3 | 3.7 |
| 10-B | 18 | 1,073 | 444 | 2.42 | [4]817 | 0.50 | 4.7 | 7.0 | 3.9 | 4.6 | 3.6 | 4.6 |
| 11 | 18 | 1,000 | 415 | 2.04 | 827 | Insol. | 5.3 | 8.6 | 3.9 | 5.2 | 4.5 | 4.7 |
| 12 | 18 | 1,000 | 415 | 2.40 | 980 | 1.47 | 4.5 | 7.6 | 3.5 | 4.4 | 3.9 | 4.0 |
| 13 | 18 | 1,000 | 925 | 3.40 | 1,097 | 0.45 | 7.1 | 12.7 | 5.2 | 7.4 | 7.8 | 6.5 |

[1] In $\eta$ rel./C. at C.=0.1% in 98/2 p-Chlorophenol/$\alpha$-pinene at 60° C.
[2] In original CEP copolymer.
[3] Contaminated.
[4] Re-precipitated.
[5] Spillage.
*DSTG = Disodium thioglycolate.

Structure and properties of ionic copolymers

The variation of optical and mechanical properties with variation in comonomer content and some characterization of their structure is shown in subsequent tables with respect to specific copolymers of this group of examples including some terpolymers with BDGE. The copolymers, as initially prepared, were further purified by re-dissolution and precipitation.

Tests were conducted on compression-molded films. Both a "fast" and a "slow" cooling cycle were used since it was found that the clarity and ductility of the films were dependent upon molding conditions. The polymers were dried at 110° C. under vacuum for 2 hours, and then molded between Ferrotype-backed Mylar sheets at 180° C., using a 30-second pre-heat without pressure and 60-seconds molding at 20-tons force. The film area was 5 inches square, and the thickness was regulated by the amount of polymer and by using a "picture frame." For the fast cooling cycle the molding assembly was transferred rapidly to another water-cooled press at about 16° C. The slow cycle consisted of transferring to a press at 90° C., holding under pressure for 3 minutes, followed by removing the assembly and allowing it to cool to room temperature (about 25° C.). The slow cycle was established by preliminary tests as a compromise that gave a noticeable difference in clarity from the fast cycle without resulting in such embrittlement of the film as to prohibit testing.

X-ray diffraction analyses were conducted using the method of Hammer, Koch and Whitney, J. Appl. Polymer Sci., 1, 169 (1959). From the diffraction curves were calculated the values for $C_X$, a degree of crystallinity, and $D_{100}$, a distance characteristic of crystallite size in a direction perpendicular to the molecular chain direction. $D_{105}$, which is a measure of the crystallite size parallel to the chain direction, could usually not be measured because of excessive broadening of this diffraction peak.

Calorimetric characterization of the polymers was performed with a Perkin-Elmer DSC–1 scanning calorimeter. The samples, in film form, were heated in a nitrogen atmosphere from ambient temperature to 187° C. at 20° C./min., were held for 2 minutes at this temperature, and were then cooled at 20° C./min. The freezing curves were well defined, with a horizontal baseline in the melt region and a more or less sharply delineated onset of crystallization. After the peak there was considerable "tailing," which caused the end of crystallization to be somewhat indefinite.

An estimate of the heat of crystallization was obtained by measuring the area between the exotherm and a baseline extrapolated from the horizontal portion of the low temperature (solid region) baseline. The area was converted to caloric units by calibration with indium. Temperature scale calibration was done by fitting a parabola to the observed melting points of lead, tin and indium.

The onset of melting was too gradual to permit estimation of the heat of fusion. Melting-peak (or occasionally peaks) determination was straightforward. The end of melting was almost always within 5° C. (plus or minus 2° C.) of the peak. No significant differences were observed in the DSC behavior of slow- and fast-cooled films. Hence, when both were measured the results were averaged.

Clarity (the property of primary interest) was determined using ASTM Method D1003–61. In this procedure diffuse transmittance and total transmittance are measured; the haze is the former divided by the latter. According to ASTM, this procedure is not applicable to materials with more than 30% haze. However, since the main objective was to produce materials having much better clarity than this, the use of the procedure for less transparent films, in order to observe trends, is not unreasonable. The film thickness was kept approximately constant at 7±2 mils. There were two sources of haze other than the intrinsic light scattering of the samples, namely, traces of contaminants such as fibers from the filters used in the work-up procedures, and flow or other surface marks from molding. Although efforts were made to eliminate these factors, they were not eliminated completely. Products made by a large-scale operation and using more suitable extrusion equipment would undoubtedly show better clarity than films made from the ionic copolymers of these examples.

Curves were plotted of the percentage haze versus the STEG ("sodium thioether glycolate") content in mols/ 100 CH$_2$O for both slow-cooled and fast-cooled moldings of both ionic binary polymers of TO and CEP and ternary polymers of TO, BDGE and CEP. The plotted data show that there is relatively little effect of the presence of ionic groups initially but at somewhere near the level of 3 or 4 mols per 100 mols CH$_2$O, the precent haze drops rapidly. Optimum transparency of the films (i.e., substantially clear films) is not obtained until somewhere near the 6–8 mol percent level of pendant ionic groups per mol CH$_2$O. The slow-cooled films were all considerably less transparent than the quenched films except at the very highest content of STEG.

The optical, X-ray and calorimetric data that were obtained on the ionic copolymers of Examples 1, 4, 5, 6, 9, 10, 12 and 13 are given in Table III which follows. For purpose of comparison similar data are also given on the copolymer precursors of Examples 1, 4 and 6, and on two different commercially available non-ionic oxymethylene polymers designated in the table as polymers A and B. Polymer A is homopolymeric oxymethylene while polymer B is an oxymethylene copolymer containing about 1.4 mols ethylene oxide (EO) per 100 mols $CH_2O$ derived from trioxane comonomer.

Surprisingly, however, when two curves are plotted of the average values, the one for maximum tensile strength vs. comonomer content and the other for tensile modulus vs.

TABLE III.—OPTICAL, X-RAY AND CALORIMETRIC ANALYSES

| | Polymer | | Copolymer Precursor of Example No. | | | Ionic Copolymer of Example Number | | | | | | | |
|---|---|---|---|---|---|---|---|---|---|---|---|---|---|
| | A[1] | B[2] | 4 | 1 | 6 | 4 | 1 | 12 | 10 | 6 | 9 | 13 | 5 |
| Comonomer (mols/100 $CH_2O$) | | | 1.6 | 3.2 | 4.8 | 1.3 | 2.8 | 4.0 | 4.2 | 4.4 | 5.6 | 7.2 | 8.4 |
| Optical properties: | | | | | | | | | | | | | |
| Percent transmission, Fast cooled | 80 | 74 | 83 | 88 | | 82 | 72 | 68 | 72 | 70 | 82 | 77 | 87 |
| Percent haze, Fast cooled | 99 | 99 | 98 | 100 | | 98 | 72 | 40 | 28 | 51 | 8 | 17 | 8 |
| Percent transmission, Slow cooled | | | | | | 83 | 72 | 64 | 67 | 66 | 73 | 74 | 85 |
| Percent haze, Slow cooled | | | | | | 100 | 93 | 76 | 89 | 83 | 29 | 27 | 7 |
| X-ray analysis: | | | | | | | | | | | | | |
| Percent "crystallinity", Fast cooled | 82 | 77 | 78 | 74 | | 78 | 74 | 68 | 66 | 66 | 68 | 54 | 58 |
| $D_{100}$ A., Fast cooled | 324 | 377 | 368 | 360 | | 463 | 295 | 268 | 162 | 154 | 91 | 96 | 84 |
| Percent "crystallinity", Slow cooled | | | | | | 82 | 74 | 71 | 71 | 66 | 69 | 64 | 58 |
| $D_{100}$ A., Slow cooled | | | | | | 463 | 438 | 364 | 338 | 275 | 205 | 155 | 96 |
| DSC analysis: | | | | | | | | | | | | | |
| Melting peak temperature, °C | 175 | 161 | 164 | 156 | 149 | 163 | 156 | 151 | 149 | 149 | | 142 | 143 |
| Freezing onset temp., °C | 150 | 144 | 143 | 136 | 133 | 143 | 136 | 133 | 129 | 130 | | 126 | 128 |
| Freezing peak temp., °C | 144 | 139 | 138 | 131 | 127 | 138 | 124 | 126 | 119 | 118 | | 115 | 110 |
| Heat of crystallization, cal./g | 34.6 | 28.6 | 26.6 | 22.1 | 19.8 | 26.2 | 21.3 | 19.2 | 19.1 | 19.0 | | 12.9 | 7.7 |
| Percent "crystallinity"[3] | 69 | 57 | 53 | 44 | 40 | 52 | 42 | 38 | 38 | 38 | | 26 | 15 |

[1] Homopolymeric oxymethylene.
[2] Oxymethylene copolymer containing about 1.4 mols ethylene oxide per 100 mols $CH_2O$ from trioxane.
[3] Calculated, assuming $\Delta H_c$ of 100% cryst. polymer is 50 cal./g.

Tensile properties

The tensile properties of some of the ionic copolymers of the various examples are given in Table IV. These properties were determined on compression-molded films that had been prepared as previously has been described. Five replicates were averaged for each test. Modulus determinations were made with serrated grips to prevent slippage; and, for ultimate property determinations, rubber-faced grips were used to prevent tearing at the jaws. In carrying out the tests there was sometimes a problem in deciding the point of ultimate or break elongation because the films would fail by tearing around a flaw or pinhole in the film. In such cases the point at which the first large decrease in load was noted was taken as the break point.

The data given in Table IV are properties of fast-cooled films when conditioned and tested under 50% relative humidity (R.H.) conditions. The replicated numbers represent separate determinations made at different times with films prepared separately, and in some cases using different polymer work-up procedures. For comparative purposes corresponding data are given for the aforementioned polymer B (oxymethylene copolymer of trioxane and ethylene oxide) and of the copolymer precursors of Examples 1 and 4.

Table IV follows.

comonomer content, these values fall very well on smooth curves, which in fact are almost superimposable. The modulus is thus very nearly twenty-five times the tensile strength, which has been found to be true for many polymers. [L. E. Nielsen, "Mechanical Properties of Polymers," p. 129, Reinhold Publishing Corporation, New York, N.Y. (1962)].

Another striking effect of the introduction of ionic groups into an oxymethylene copolymer in accordance with the instant invention is that it causes the ductility of the copolymer to be greatly increased. Because elongation is a property that is also sensitive to molecular weight changes, it is not easy to demonstrate this fact quantitatively. However, the comparisons of the data on percent elongation at break for the copolymer precursors of Examples 1 and 4 with that of the ionic copolymers of these same examples is useful in establishing or at least indicating this ductility increase. It is also mentioned that, although the copolymer precursor of Example 6 was too brittle to determine tensile properties thereof, the ionic copolymer produced therefrom showed considerable ductility even though its inherent viscosity (I.V.) was only 0.5 dl./g.

It has been found that the cooling rate not only has a pronounced effect upon clarity but also has a significant effect upon tensile properties, especially ductility. This is

TABLE IV.—TENSILE PROPERTIES, 50% R.H., FAST COOLED FILMS

| | Polymer B | Copolymer Precursor of Example Number | | Ionic Copolymer of Example Number | | | | | | |
|---|---|---|---|---|---|---|---|---|---|---|
| | | 4 | 1 | 4 | 1 | 12 | 10 | 6 | 13 | 5 |
| Comonomer content (mols/100 $CH_2O$) | 1.4 | 1.6 | 3.2 | 1.3 | 2.8 | 4.0 | 4.2 | 4.4 | 7.2 | 8.4 |
| Inherent viscosity (dl./g.) | 1.4 | 0.92 | 0.82 | 0.70 | 0.63 | 1.48 | 0.54 | 0.50 | 0.46 | 0.30 |
| Maximum tensile strength (p.s.i.) | [1]8,200 | [1]8,700 | [1]7,600 | [1]7,900 | [1]5,200 | | | [1]3,300 | | [4] |
| | [1]8,400 | | | [2]8,200 | [2]5,800 | | | [2]4,000 | | |
| | [1]8,000 | | | | | | | | | |
| | [1]8,600 | | | | [3]4,000 | [3]3,300 | | | [3]1,800 | |
| Break tensile strength (p.s.i.) | [1]7,600 | [1]8,300 | [1]7,600 | [1]7,800 | [1]5,000 | | | [1]3,000 | | [4] |
| | [1]7,900 | | | [2]8,200 | [2]5,800 | | | [2]3,900 | | |
| | [1]7,100 | | | | | | | | | |
| | [1]7,400 | | | | | [3]3,000 | [3]2,800 | | | [3]1,800 |
| Elongation at break (percent) | [1]30 | [1]17 | [1]10 | [1]20 | [1]31 | | | [1]42 | | [4] |
| | [1]29 | | | [2]9 | [2]14 | | | [2]20 | | |
| | [1]68 | | | | | | | | | |
| | [1]52 | | | | | [3]67 | [3]62 | | [3]97 | |
| Tensile modulus (p.s.i.×10⁵) | [1]2.49 | [1]1.68 | [1]1.75 | [1]1.30 | [1]1.06 | | | [1]0.61 | | |
| | [1]2.55 | | | [3]2.14 | [3]1.17 | | | [3]0.83 | | |
| | [1]2.25 | | | [3]2.56 | [3]1.47 | [3]0.91 | [3]0.82 | [3]0.95 | [3]0.37 | [3]0.32 |
| | [1]2.19 | | | | | | | | | |

[1] 0.5" gauge length, 0.2"/min. cross-head speed.
[2] 1" gauge length, 0.2"/min. cross-head speed.
[3] 1" gauge length, 0.1"/min. cross-head speed.
[4] Too brittle to test.

From a consideration of the data in Table IV it will be noted that, although the reproducibility of the tensile-strength measurements is fairly good, there is considerable variation in the elongation and modulus measurements.

illustrated by the data given in Table V. From a consideration of the data given in this table it will be noted that both the tensile modulus and tensile strength increase slightly as the cooling rate is decreased. These increases seem to be of the same general order as might be expected from the observed increase in X-ray crystallinity. However, the change in elongation is much more striking, and possibly is more a reflection of the change in the perfection of the crystallites rather than a change in the crystalline content.

Table V follows.

TABLE V.—EFFECT OF COOLING RATE ON TENSILE PROPERTIES OF IONIC COPOLYMERS

| | Ionic Copolymer of Example Number | | | | | | | | | |
|---|---|---|---|---|---|---|---|---|---|---|
| | 4 | | 1 | | 12 | | 6 | | 13 | |
| Comonomer (mols/100 CH$_2$O) | 1.3 | | 2.8 | | 4.0 | | 4.4 | | 7.2 | |
| I.V. (dl./g.) | 0.70 | | 0.63 | | 1.48 | | 0.50 | | 0.46 | |
| Cooling rate | Fast | Slow | Fast | Slow | Fast | Slow | Fast | Slow | Fast | Slow |
| Max. tensile strength (p.s.i.) | 8,200 | 8,600 | 5,800 | 6,400 | 4,000 | 5,100 | 4,000 | 4,000 | 1,800 | 2,200 |
| Break tensile strength (p.s.i.) | 8,200 | 8,600 | 5,800 | 6,400 | 4,000 | 4,800 | 3,900 | 4,000 | 1,800 | 2,100 |
| Elongation at break (percent) | 9 | 7 | 14 | 11 | 67 | 26 | 20 | 6 | 97 | 49 |
| Tensile modulus (p.s.i.×10$^5$) | 2.56 | 2.84 | 1.47 | 1.69 | 0.91 | 1.05 | 0.95 | 1.31 | 0.37 | 0.49 |

Flow properties

The effects of variations in the content of ionic groups on the flow properties of some of the ionic copolymers of Examples 1–13 were determined in a qualitative fashion, relying on the 1× and 10× Melt Index tests [ASTM D–1238, Conditions E (for 1×) and F (for 10×)]. The data are given in Table VI.

It will be noted from a consideration of these data that the most striking effect is that the viscosity of an ionic copolymer is very much higher than that of a non-ionic copolymer of the same comonomer source and the same molecular weight. For purpose of comparison it might be noted that the aforementioned polymer B (oxymethylene copolymer containing about 1.4 mols EO per 100 mols CH$_2$O) has an I.V. of 1.4; while an oxymethylene copolymer containing about 2 mol percent EO and having an I.V. of 1.0 has a melt index of about 30 dgs./min. [H. L. Wagner and K. F. Wissbrun, Makromol. Chemie 14 (1965)]. Although variations in I.V. make quantitative comparisons difficult, it appears that the effect increases with an increase in the content of the ionic groups. By "effect" it is meant that the melt index of the ionic copolymer is much lower than that of a non-ionic copolymer of the same molecular weight.

Another observation that may be made from the data given in Table VI is that the temperature dependence of melt viscosity is also greater for ionic polymers than for non-ionic polymers. Again, for comparative purposes it may be mentioned that a 40° C. increase in temperature is required to double the melt index of the previously described polymer B, which is a commercial product, whereas the melt index of the ionic copolymers of Examples 1, 4 and 6 is increased even more than this by only a 20° C. temperature increase.

The 10×/1× melt-index ratios of the ionic copolymers shown in Table VI are in the range normally found for non-ionic oxymethylene copolymer B, and indicate that the molecular-weight distributions are reasonably narrow. This conclusion is fairly consistent with the nearly random distribution of comonomer units deduced from analytical and hydrolysis data. As would be expected, the ionic terpolymer of Example 12 has a high 10×/1× ratio. Furthermore, the extrudate swelling is high (110%) swell on the 10× extrudate, which was not observed with the ionic binary copolymers.

TABLE VI.—FLOW PROPERTIES ON IONIC COPOLYMERS

| Copolymer of Example Number | 4 | 1 | 6 | 12 |
|---|---|---|---|---|
| Mols STEG $^2$/100 CH$_2$O | 1.3 | 2.8 | 4.4 | $^1$ 4.0 |
| I.V. of copolymer precursor | 0.9 | 0.8 | 0.6 | 1.7 |
| I.V. of ionic copolymer | 0.7 | 0.6 | 0.5 | 1.5 |
| 190° C.: | | | | |
| M.I. (dg./min.) | 5.5 | 1.4 | 2.4 | 0.13 |
| 10× M.I. (dg./min.) | 130 | 32 | 42 | 4.7 |
| Ratio 10×/1× | 24 | 23 | 18 | 36 |
| 170° C.: | | | | |
| M.I. (dg./min.) | 2.2 | 0.44 | 0.94 | |
| 10× M.I. (dg./min.) | | 10.4 | 16.5 | |
| Ratio 10×/1× | | 24 | 18 | |
| Ratio M.I. (190°)/M.I. (170°) | 2.5 | 3.2 | 2.6 | |

$^1$ Contains 0.8% BDGE.
$^2$ STEG=Sodium thioether glycolate.

EXAMPLES 14–18

These examples illustrate the effect of varying the cation which is introduced into the ionic copolymers of the present invention.

The salts were prepared by slurrying 100 g. quantities of the ionic copolymer of Example 10–A, containing about 4.1 mols STEG/100 mols CH$_2$O, with 700 ml. of aqueous solutions the pH of which had been adjusted to about 8 and which contained 10-fold equivalents of various exchanging cations, specifically K, Li, Mg, Sr and Ca as the chlorides. The rate of exchange was followed by measuring the sodium ion concentration in the supernatant liquid by a sodium-sensitive glass electrode Beckman #39278) and a modified pH-meter [J. Keegan and G. Matsuyama, Anal. Chem. 33, 1292 (1961)].

The potassium ion exchanged very rapidly, the exchange being substantially complete within minutes after slurrying, while the divalent cations yielded about 30–40% exchange within a minute and complete exchange within 2 hours. After washing the exchange procedure was repeated, and the polymers were washed free of chloride, stabilized and vacuum-dried. Analyses indicated that this procedure was satisfactory. Infrared spectra showed that no hydrolysis to free carboxyl had occurred during ion-exchanging.

Molding the monovalent salts of the copolymer presented no problems, but considerable difficulty was encountered with copolymers containing the other salts due to their poor flow characteristics. The calcium, strontium and magnesium ionic copolymers discolored considerably, yielding yellow films even with a very short (15 seconds) heating cycle. The magnesium ionic copolymer discolored less than the calcium and strontium copolymers but was the most difficult to compression mold.

Marginally satisfactory films were prepared for testing. The results of the tests are given in Table VII. For comparative purposes there has also been included in the table the results of similar tests on the sodium ionic copolymer of Example 10–A from which the other cationic copolymers were prepared.

The individual monovalent (Li, Na and K) salts yielded ionic copolymers having only relatively small differences in properties between them, whereas when compared as a group with ionic copolymers wherein the cation was calcium, strontium or magnesium the property differences were much greater.

At least on rapidly cooled films, clarity is better when a divalent cation is employed in making the ionic copolymer but this advantage disappears on slow cooling. The magnesium cation confers retention of clarity to the ionic copolymers to a greater extent than do the other cations. The X-ray crystallinity provided by using divalent salts and fast-cooled molding technique is lower than when the ionic copolymer contains monovalent salts. To some extent this may reflect baseline uncertainty caused by line broadening of the smaller and/or less perfect crystallites that are formed when a divalent salt is a part of the copolymer molecule.

The DSC results, although they contain several anomalies, correlate well with the above-described data. Compared with ionic copolymers containing the monovalent salts, those which contained the divalent salts showed lowered melting peaks and even further lowered and broadened freezing peaks. This is most pronounced with the ionic copolymer containing the magnesium salt. This copolymer has the greatest supercooling and the broadest crystallization peak, and is the ony one to exhibit even a modern retention of clarity when slowly cooled.

Water sensitivity was determined by weight gain and length change upon exposing a film conditioned dry to a 90% R.H. atmosphere. Additionally, in order to check the efficiency of drying, water was determined by the Karl Fischer method on methanol extracts on the copolymers. The three monovalent salts yielded copolymers that were very similar with respect to water sensitivity, while those that contained a divalent salt were somewhat less water sensitive.

With reference to the data on tensile properties given in Table VII, it will be noted that with a change in the cation from lithium to sodium to potassium, there is a small decrease in film stiffness and strength and an increase in ductility, paralleling the small changes in clarity. Overall, however, the copolymers made to contain these different cations are quite similar. The divalent salts provide copolymers that are very different from those containing a monovalent salt. (The copolymer containing a magnesium salt was tested only qualitatively.) When first molded, the divalent salt-modified copolymers were flexible and extremely tough. Hand-testing them indicated much greater ductility than that which characterized the monovalent salt-modified copolymers. However, by the time they were tested (about a week later), the films were very stiff and extremely brittle. Their relatively low tensile strengths are a consequence of their low elongation at break and do not indicate, as with the other ionic copolymers, a yielding failure. No change in clarity occurred during this time. The rate at which the transformation from a tough, flexible copolymer to a brittle one occurs is not known.

Table VII follows.

chlorine-containing comonomer was epichlorohydrin.

It will be understood, of course, by those skilled in the art that the present invention is not limited to the use of the specific reactants, the specific conditions of reaction and the specific work-up procedures that are given in the foregoing examples by way of illustration. For example, epibromohydrin can be employed in place of epichlorohydrin, and instead of them one can use homologues thereof such as are embraced by Formula I. Furthermore, in place of 4-chloromethyl-1,3-dioxolane one can use 4-bromomethyl-1,3-dioxolane, and, if desired, instead of these one can employ the corresponding isomers of these compounds, examples of which previously have been given. Also, instead of the particular terpolymer precursors that are used in certain of the individual examples in making ionic oxymethylene terpolymers, various other comonomers that function as chain-branching agents may be employed in making the polymeric precursor.

The units from the chain-branching agent may constitute, for example, from 0.01 to about 7 weight percent, more particularly less than 1%, e.g., from 0.05 to 0.80, weight percent of the copolymer. Examples of such chain-branching agents, in addition to PEDF, VCH and BDGE used in certain of the examples, are vinylcyclohexane dioxide; the diacetal of malonaldehyde and ethylene glycol; sorbitol triformal; butadiene dioxide; the triepoxide of the triallyl ether of trimethylol propane; resorcinol diglycidyl ether; and the diglycidyl ether of bisphenol A.

The chain-branching agents employed have at least two functional oxygen atoms, and are preferably selected from the group consisting of compounds having at least two cyclic ether rings having from two to ten carbon atoms, inclusive, in each ring, and dialdehydes and diketones having from 2 to 20 carbon atoms, inclusive, e.g., a poly(1,2-epoxide) including diepoxides, triepoxides, etc.

TABLE VII.—PROPERTIES OF VARIOUS ION-EXCHANGED SALTS OF IONIC (Na) COPOLYMER OF EXAMPLE 10-A

|  | Cation | | | | | |
|---|---|---|---|---|---|---|
|  | Li | Na | K | Mg | Ca | Sr |
|  | Example No. | | | | | |
|  | 14 | 10-A | 15 | 16 | 17 | 18 |
| Clarity and Structure: | | | | | | |
| Haze (percent), Fast cooled | 39 | 28 | 26 | 17 | 15 | 16 |
| Haze (percent), Slow cooled | 91 | 89 | 70 | 46 | 75 | 87 |
| "Crystallite Size" $D_{100}$, (A.): | | | | | | |
| Fast colled | 170 | 160 | 190 | 110 | 130 | 120 |
| Slow cooled | 350 | 340 | 230 | 130 | 230 | 250 |
| "Crystallinity" (percent): | | | | | | |
| Fast cooled | 66 | 66 | 74 | 64 | 61 | 58 |
| Slow cooled | 69 | 71 | 73 | 62 | 69 | 69 |
| DSC melting peak temp. (° C.) | 148 | 149 | 147 | 142 | 146 | 144 |
| DSC freezing onset temp. (° C.) | 128 | 129 | 129 | 111 | 122 | 121 |
| DSC freezing peak temp. (° C.) | 121 | 120 | 121 | 75 | 119 | 109 |
| DSC heat of cryst. (cal./g.) | 21 | 19 |  | [5]16 | 18 | 17 |
| DSC supercooling [1] (° C.) | 27 | 29 | 26 | 67 | 27 | 35 |
| Water sensitivity: | | | | | | |
| Wt. gain, percent; 0 → 90% R.H. | 15.4 | 15.8 | 16.1 | 9.9 | 5.2 | 4.9 |
| Length, Expansion, percent; 0→90% R.H. | 6.2 | 6.7 | 6.9 | 3.8 | 2.1 | 1.9 |
| $H_2O$ by K. Fisher, percent; (50% R.H.) | 6.4 | 8.2 | 7.8 | 6.0 | 3.3 | 4.2 |
| Tensile Properties (Fast Cooled): | | | | | | |
| Max. tensile strength (p.s.i.) [3] | 3,900 | 3,300 | 3,000 | [2] | 4,500 | 5,500 |
| Elongation at Break, percent [3] | 30 | 62 | 153 | [2] | 3.5 | 4.1 |
| Modulus [4] (p.s.i.×$10^{-4}$) | 9.9 | 8.2 | 7.3 | [2] | 21.0 | 21.3 |

[1] Supercooling=peak melting−peak freezing.
[2] Not sufficient sample to determine.
[3] 1" gauge length, 0.2"/min. cross-head speed.
[4] 1" gauge length, 0.1"/min. cross-head speed.
[5] Heat of fusion; Crystallization too indistinct to measure.

EXAMPLE 19

A binary polymer precursor is prepared by copolymerization of 180 g. of trioxane and 20 g. of 4-chloromethyl-1,3-dioxolane as described in Example 14 of the aforementioned Berardinelli et al., U.S. Patent No. 3,027,609.

The resulting copolymer precursor is then converted to its ionic form by reaction with DSTG following essentially the same general procedure and using the same relative proportions of copolymer precursor and of DSTG as described hereinbefore with reference to Example 1 of Table II. The ionic copolymer that is thusly obtained has properties which are approximately the same as those of the ionic copolymer of Example 1 wherein the The chain-branching agent can be a cyclic either having at least two formal rings as in, for example, pentaerythritol diformal; or at least one epoxy ring and at least one formal ring as in, for instance, monocrotylidene trimethylolethane monoepoxide. The chain-branching agent also can be a compound having at least two oxo groups such as dialdehydes and diketones, e.g., glutaraldehyde, terephthalide and acrolein dimer.

Other examples of chain-branching agents that can be used in making the ionic copolymers of this invention are given in Heinz et al. copending application Ser. No. 444,787, filed Apr. 1, 1965, now abandoned and continued as Ser. No. 708,428, filed Feb. 26, 1968, Kakos copending application Ser. No. 550,576, filed May 16, 1966. Application Ser. No. 444,787 is a continuation-in-part of application Ser. No. 229,715, filed Oct. 10, 1962 (now abandoned), which in turn is a continuation-in-part of application Ser. No. 153,720, filed Nov. 20, 1961 (also now abandoned). Both the Heinz et al. and the Kakos applications are assigned to the same assignee as is the present invention.

The ionic copolymers of this invention can be thermally stabilized by adding stabilizers, e.g., a nitrogenous stabilizer such as cyanoguanidine alone or in combination with melamine, or others of the kind used to thermally stabilize non-ionic oxymethylene copolymers. Other effect agents also can be added such as U.V. stabilizers; fillers including those of glass, metal, cellulosic and others commonly used for this purpose, in fiber, finally divided (particulate) or other form; plasticizers; pigments; coloring agents; and the like.

It is to be understood that the foregoing detailed description is given merely by way of illustration and that many variations may be made therein without departing from the spirit and scope of the invention.

The embodiments of the invention in which an exclusive property or privilege is claimed are defined as follows:

1. An oxymethylene copolymer obtained by the reaction of
   (a) a primary oxymethylene copolymer obtained by the reaction of a formaldehyde-engendering compound and at least one comonomer containing an epoxy group and halogen moiety so as to produce said primary oxymethylene copolymer having a reactive halogenoalkyl pendant group wherein said halogen is selected from the group consisting of chlorine and bromine and wherein said pendant halogenoalkyl groups are present in an average quantity of from about 1 to about 40 per 100 —OCH$_2$— groups in said copolymer, and
   (b) a di (metal) salt, of a thiol-substituted saturated aliphatic carboxylic acod, selected from the group consisting of acids of the general formula $$HS—(CH_2)—_n—COOH$$

wherein $n$ is a positive integer from 1 to 6, inclusive and

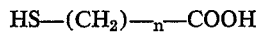

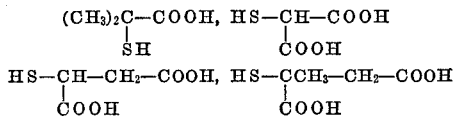

and

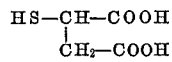

wherein the metal is selected from the group consisting of alkali metals, alkaline earth metals and magnesium; wherein the amount of said di (metal) salt is at least the theoretical stoichiometrical amount required to couple said salt through its —SM group or groups wherein M is the metal, with said primary copolymer by displacement of the halogen in said halogenoalkyl group of the copolymer and the formation of the metal salt of the halogen as a by-product of the reaction.

2. A composition as in claim 1 wherein the halogenoalkyl pendant groups are chloroalkyl pendant groups.

3. A composition as in claim 1 wherein the metal salt of B is a salt of a monovalent metal.

4. A composition as in claim 3 wherein the monovalent metal salt is a salt of an alkali metal.

5. A composition as in claim 4 wherein the alkali metal is sodium.

6. A composition as in claim 1 wherein the copolymer of A contains reactive chloromethyl groups and the metal salt of B is a di-(alkali-metal) salt of a thiol-substituted saturated aliphatic monocarboxylic acid represented by the general formula HS—(CH$_2$)$_n$—COOH wherein $n$ represents a positive integer from 1 to 6, inclusive.

7. A composition as in claim 6 wherein the metal salt of B is disodium thioglycolate.

8. A composition as in claim 1 wherein the oxymethylene copolymer of A is a copolymer of (a) trioxane and (b) at least one comonomer containing both an epoxy group and a chlorine-substituted alkyl group, and said copolymer contains chloroalkyl pendant groups in an average quantity corresponding to from about 1 to about 40 of the said groups per 100 —OCH$_2$— groups in the said copolymer.

9. A composition as in claim 8 wherein the comonomer of (b) is a compound represented by the general formula

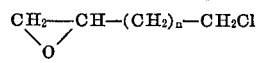

wherein $n$ represents a numeral from zero to 4, inclusive; the copolymer of A contains chloroalkyl pendant groups in an average quantity corresponding to from about 3 to about 30 of the said groups per 100 —OCH$_2$— groups in the said copolymer; and the metal salt of B is a di-(alkalimetal) salt of thioglycolic acid.

10. A composition as in claim 9 wherein the comonomer of (b) is epichlorohydrin and the metal salt of B is disodium thioglycolate.

11. A composition as in claim 8 wherein the copolymer additionally contains from 0.01 to about 7 weight percent of a chain-branching agent having at least two functional oxygen groups and being selected from the group consisting of compounds having at least two cyclic ether rings having from 2 to 10 carbon atoms, inclusive, in each ring, and dialdehydes and diketones having from 2 to 20 carbon atoms, inclusive.

12. A composition as in claim 11 wherein the chain-branching agent is pentaerythritol diformal.

13. A composition as in claim 11 wherein the chain-branching agent is vinylcyclohexane diepoxide.

14. A composition as in claim 11 wherein the chain-branching agent is butanediol diglycidyl ether.

15. A method for the production of oxymethylene copolymers which comprises,
   (I) reacting in a liquid medium comprising a volatile solvent and at a maximum temperature within the range of from about 120° C. to about 180° C.,
      (a) a primary oxymethylene copolymer obtained by the reaction of a formaldehyde-engendering compound and at least one comonomer containing an epoxy group and halogen moiety so as to produce said primary oxymethylene copolymer having a reactive halogenoalkyl pendant group wherein said halogen is selected from the group consisting of chlorine and bromine and wherein said pendant halogenoalkyl groups are present in an average quantity of from about 1 to about 40 per 100 —OCH$_2$— groups in said copolymer, with
      (b) a di(metal) salt, wherein the metal is selected from the group consisting of an alkali metal, and alkaline earth metal, and magnesium of a thiol-substituted saturated aliphatic carboxylic acid, selected from the group consisting of acids of the general formula $$HS—(CH_2)_n—COOH$$

wherein $n$ is a positive integer from 1 to 6, inclusive and

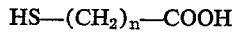

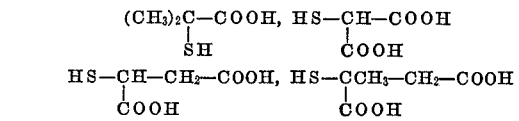

and

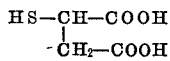

wherein the amount of said di(metal) salt is at least the theoretical stoichiometrical amount required to couple said salt through its —SM, group or groups where M is the metal with said primary copolymer by displacement of the halogen in said halogenoalkyl group of the copolymer and the formation of the metal salt of the halogen as a by-product of the reaction, and (II) isolating and purifying the resulting ionic oxymethylene copolymer.

16. The method as in claim 15 wherein the liquid reaction medium comprises water; the oxymethylene copolymer of A is a copolymer of trioxane and epichlorohydrin, and contains chloromethyl pendant groups in an average quantity corresponding to from about 3 to about 30 of the said groups per 100 —OCH$_2$— groups in the said copolymer; the pH of the reaction mass at the beginning of the reaction period is at least about 9, and is basic throughout said period; the metal salt of B is disodium thioglycolate; and the amount thereof is from about 100% to about 1000% is excess of the theoretical stoichiometrical amount required to couple the said thioglycolate through its —SNa group with the said copolymer by displacement of the chlorine in the said chloromethyl pendant groups of the copolymer and the formation of sodium chloride as a by-product of the reaction.

17. The method as in claim 16 wherein the copolymer of trioxane and epichlorophydrin contains chloromethyl pendant groups in an average quantity corresponding to from about 5 to about 20 of the said groups per 100 —OCH$_2$— groups in the said copolymer; the maximum reaction temperature is within the range of from about 140° C. to about 170° C.; the pH of the reaction mass at the beginning of the reaction period is within the range of from about 9 to about 13, and is basic throughout said period; and the amount of disodium thioglycolate is about 100% in excess of the stoichiometrical amount required for coupling with the oxymethylene copolymer.

18. The method as in claim 17 wherein the maximum reaction temperature is about 160° C.; the pH of the reaction mass at the beginning of the reaction period is about 10, and is basic throughout said period; and the period of time that the reactants are undergoing reaction in the reaction vessel is about 1 hour.

19. A composition as in claim 1 wherein the metal salt is a salt of an alkaline-earth metal.

References Cited
UNITED STATES PATENTS

| | | | |
|---|---|---|---|
| 2,828,287 | 3/1958 | Cairns et al. | 260—67 |
| 3,054,781 | 9/1962 | Tsou | 260—79.1 |
| 3,219,631 | 11/1965 | Kullmer et al. | 260—67 |
| 3,234,236 | 2/1966 | Sander et al. | 260—327 |

WILLIAM H. SHORT, Primary Examiner

L. M. PHYNES, Assistant Examiner

U.S. Cl. X.R.

260—45.7, 45.85, 79